United States Patent [19]

Loofbourrow

[11] 3,872,465

[45] Mar. 18, 1975

[54] SEISMIC PLAYBACK/MONITOR SYSTEM

[75] Inventor: Robert J. Loofbourrow, Houston, Tex.

[73] Assignee: Texaco Inc., New York, N.Y.

[22] Filed: Apr. 27, 1973

[21] Appl. No.: 354,969

Related U.S. Application Data

[63] Continuation of Ser. No. 113,844, Feb. 9, 1971, abandoned.

[52] U.S. Cl...... 340/347 DA, 235/154, 340/347 CC, 340/15.5 FC

[51] Int. Cl. ........................................... H03k 13/04

[58] Field of Search............340/347 CC, 347 DA, 340/347 AD, 15.5; 235/154, 150.52, 235/150.53, 197

[56] References Cited

UNITED STATES PATENTS

| | | | |
|---|---|---|---|
| 3,037,699 | 6/1962 | Lee et al. | 235/154 |
| 3,221,155 | 11/1965 | Birkel | 235/154 |
| 3,500,247 | 3/1970 | Sekimoto et al. | 340/347 AD |
| 3,555,540 | 1/1971 | Hartke | 340/347 |
| 3,562,504 | 2/1971 | Harris | 235/154 |
| 3,588,880 | 6/1971 | Gross et al. | 340/347 DA |

*Primary Examiner*—Malcolm A. Morrison
*Assistant Examiner*—Vincent J. Sunderdick
*Attorney, Agent, or Firm*—T. H. Whaley; C. G. Ries

[57] ABSTRACT

Hereinafter disclosed is methodology and apparatus for converting wide dynamic amplitude range digital data recorded in floating point digital word form, comprising a binary coded mantissa and a binary coded exponent, to an analog signal or visible display, such as an oscillogram, or "wiggle trace," of selectively compressed dynamic amplitude range. The digital word occupying a number of binary digit, or bit, positions is, in algebraic form, $\pm AG^{-E}$; wherein A represents the mantissa or argument, G represents the base, or radix, of the number system employed, and E represents the exponent. Since the radix G is constant, the only bits that have to be recoreded are those bits representing the mantissa A and the exponent E. In reconverting the aforementioned digital data to analog form data for making an oscillogram, wiggle trace or other visible display, the invention involves the selective compression of the dynamic amplitude range of the analog signals and, at the same time, avoiding the introduction of serious distortions.

14 Claims, 4 Drawing Figures

SEISMIC PLAYBACK/MONITOR SYSTEM

CROSS-REFERENCE TO RELATED APPLICATIONS

This application is a continuation as to all subject matter common to U.S. application Ser. No. 113,844 now abandoned, filed on Feb. 9, 1971, by Robert J. Loofbourrow and assigned to Texaco Inc., assignee of the present invention, and a continuation-in-part for all additional subject matter.

BACKGROUND OF THE INVENTION

This invention pertains, in general, to making analog form playbacks from digitally recorded data (e.g. seismic data) which has been digitized from wide dynamic amplitude range analog form signals initially generated by transducers, such as geophones, in response to acoustically induced seismic disturbances; and, in particular, to the making of analog form playbacks such as oscillograms (or wiggle traces as they are often called by those engaged in seismic work) which are approximate but very useful reproductions in compressed range of the wide dynamic range amplitude-versus-time characteristic curves of the analog signal initially generated by the aforementioned transducers.

The aforementioned oscillograms may be made substantially simultaneously with the acquisition of the signals generated by the geophones; i.e., the system may function as a monitoring system. In the alternative, the oscillograms may be made at any convenient time after the acquisition of the signals generated by the geophones; i.e., the system may function as a playback system.

Although the invention is hereinafter described as being employed in conjunction with digital seismic recording systems such as those disclosed in the patents and patent applications hereinafter identified it is, nevertheless, to be understood that the invention's field of use is not limited to seismic data processing.

In seismic exploration work each acoustically driven geophone generates wide dynamic amplitude range signals in analog form. When such signals are processed through a digital seismic recording system there is produced a high fidelity record in digital form covering the wide dynamic range of amplitudes of the seismic signals. The reason that the digital form record is referred to herein as a high fidelity record is because the signal amplitudes are recorded accurately throughout their wide dynamic range; e.g., many binary digit, or bit, positions are used to precisely record the highest signal amplitude as well as the lowest where the range (i.e., the ratio of the highest signal amplitude to the lowest signal amplitude) may be of the order $10^6$.

The subject invention provides a method and apparatus for making analog form oscillograms, or wiggle traces, from the recorded digital data. The oscillograms, or wiggle traces, are of relatively lower fidelity than the aforementioned digitally recorded data. Although the oscillograms are of relatively lower fidelity serious distortions are, nevertheless, not introduced in reconverting the digital data to analog data for the purpose of making compressed amplitude range oscillograms.

The recordation in digital form of wide dynamic amplitude range analog signals initially generated by geophones is disclosed in, among others, the following: U.S. Pat. No. 3,241,100 issued Mar. 15, 1966 in behalf of R. J. Loofbourrow and entitled "Digital Seismic Recording System"; U.S. Pat. No. 3,264,574 issued Aug. 2, 1966 in behalf of R. J. Loofbourrow and entitled "Amplifier System"; U.S. Pat. application Ser. No. 786,706, filed Dec. 24, 1968 in behalf of James R. Vanderford and entitled "Amplifier System"; and U.S. Pat. application Ser. No. 42,653, filed June 2, 1970 in behalf of Donald L. Howlett and entitled "Seismic Playback/Monitor System."

As is disclosed in the Patents and Patent Applications hereinbefore identified the problem solved is the problem of accurately recording seismic data which in analog form has a dynamic range of amplitudes which is extremely wide. For example, a typical analog signal level for a reflection seismic record runs from several volts of amplitude at its maximum, at the early shock portion of the record, to less than a single microvolt at the end of the seismic record when very low amplitude seismic disturbances are detected. In general, the aforementioned Patents and Patent Applications disclose systems for converting the wide dynamic amplitude range analog signals to digital form. When converted to digital form occupying a relatively large number of binary digit, or bit, positions the full dynamic amplitude range of the analog signals initially generated by a geophone is preserved in recorded form; e.g., on magnetic tape. Advantageously, the magnetically recorded digital data may, subsequently, be delivered to a computer for further processing. Some methods and some purposes for which such digital data is subsequently processed in a computer are disclosed in an article "Tools for Tomorrow's Geophysics" by Milton D. Dobrin and Stanley H. Ward, published in the Journal "Geophysical Prospecting", volume X, at pages 433–452 (1962).

In the aforementioned Patent Applications of Vanderford and Howlett there is described a system wherein portions of an analog signal are converted to digital words wherein each digital word occupies a number of binary digit, or bit, positions. Moreover, each such digital word is recorded in floating point form. The floating point form of notation allows greater flexibility of operation and easier handling of numbers differing greatly in magnitude from each other. (See, for example, the textbook "Digital Computer Primer" by E. M. McCormick, 1959, published by McGraw-Hill Book Company, Inc., beginning at page 152.) In the system disclosed in the Vanderford and Howlett patent applications, hereinbefore identified, a floating point digital number, or word, in the form of a mantissa, or argument, and an exponent is recorded on a suitable storage medium such as magnetic tape. The floating point digital word represents the instantaneous absolute seismic voltage amplitude as it is introduced to a floating point amplifier system. The dynamic range of the floating point word may be in excess of 200 db, if necessary, to cover the dynamic range of input signal (equivalent to a 36 binary digit, or bit, digital number, or word).

As a specific example the floating point word as set forth in conventional algebraic form is as follows:

$$e_{in} = \pm AG^{116\,E} \quad (1)$$

wherein $e_{in}$ represents the absolute magnitude or amplitude of the floating point word; $A$ represents the mantissa, or argument, portion of the word; $G$ represents the base, or radix, of the number system used ($G = 10$ in the decimal, or base 10, system or $G = 8$ in the octal system); and, $E$ represents the exponent.

As is suggested in the patent applications hereinbefore identified, the floating point digital word is in the form $$Q = \pm AB^{116\ E} \qquad (2)$$

Wherein $Q$ represents the absolute magnitude of the amplitude of the input signal delivered to an arrangement of amplifiers, each of which has a gain of eight (8) and hence the base $G$ in equation 1 becomes 8 in equation 2; the mantissa $A$ represents the output amplitude of a particular amplifier in the aforesaid arrangement; and $E$, the exponent, represents the number of amplifier stages of gain of 8 through which the aforesaid input signal has been processed.

In order to record the floating point digital word of equation 2 in a binary register with, for example, 144 db of dynamic range and with 14 binary digit, or bit, accuracy, 18 bit positions would be required where the mantissa A is represented in binary form (i.e., where the base, or radix, of such a number system is 2) and where the exponent E is also represented in binary form. Of the 18 bits required: one bit represents the sign allowing for bipolar input-output capabilities; 14 bits represent the mantissa A; and, 3 bits represent the exponent E.

Although there are many advantages (some of which are set forth in the aforementioned article by Dobrin and Ward) to recording seismic signals in digital form, there still remains the need to make available to a seismic prospector a visible display or recording of the seismic data, or portions thereof. Conventionally, the visible record is an oscillogram, or wiggle trace as it is often called by seismic prospectors. Often, it is desirable for a seismic prospector in a seismic field crew in a remote location from a main data processing center to take a quick look at a portion of the seismic data from time to time. For example, a seismic prospector may wish to make some interpretations with respect to the wiggle traces in order to coordinate such data with geological data.

The invention, hereinafter disclosed and illustrated in the accompanying drawing, is particularly concerned with converting the recorded digital data to the familiar wiggle-trace form on recording paper. The recording paper allows for about 40 db dynamic amplitude range while the digital floating point word may have a dynamic range of 156 db or more. Hence, in converting from digital form to a practical analog form selective compression of the various amplitudes must occur. In such a conversion distortion is necessarily introduced. However, in accordance with the methodology and according to the present invention, such distortion is minimized and as a result there is provided analog form data in the form of oscillograms, or wiggle traces, which provide useful information to seismic prospectors, among others.

SUMMARY OF THE INVENTION

One object of the invention is to convert data from digital form to analog form.

Another object of the invention is to provide new and useful methodology for converting data from digital form to analog form.

Another object of the invention is to provide new and useful apparatus for converting data from digital form to analog form.

Another object of the invention is to convert wide dynamic amplitude range digital data (e.g., seismic data) to analog form displays such as oscillograms, or wiggle traces.

Another object of the invention is to convert wide dynamic amplitude range digital data to analog form data as oscillograms, which oscillograms are selectively compressed reproductions of wide dynamic amplitude range analog signals which existed prior to their conversion to said digital data.

Another object of the present invention is to convert wide dynamic amplitude range digital form data to analog form data having selectively compressed amplitude without introducing serious distortions.

In accordance with one illustrative embodiment of the invention, a digitally recorded signal representative of a mantissa A and an exponent E are processed for the purpose of producing analog signals suitable for driving a galvanometer in order to make oscillograms from the analog signals. In order to obtain a suitably compressed amplitude range analog signal for making the oscillogram, the binary digits, or bits, representing the mantissa A and the exponent E are separately processed. The following discussion assumes that a digital word representing the analog signal amplitude consists of 18 binary digits, or bits: 3 bits represent the exponent E; 14 bits represent the mantissa A; and 1 bit represents the sign. The bits representing the mantissa A are delivered to a 3-bit-at-a-time shift register which is operable in the manner hereinafter described to digitally shift the mantissa A in steps of three bits (gain of 8). Simultaneously, the 3 bits representing the exponent E are delivered to an exponent subtractor unit which drives a shift register control unit. The exponent subtractor unit receives two sets of inputs, each set being in binary digit, or bit form. The first set consists of the 3 bits representing the exponent E; the second set consists of 3 bits representing a number K generated by a 3 -bit binary counter. The exponent subtractor unit produces a digital output signal representative of the difference (K − E), and this digital output signal drives the aforementioned shift register control unit. For purposes of brevity suffice it, at this point, to say that the digital signal representing the number K, which is produced by the three-bit binary counter, is a function of a periodically varying reference voltage $V_{ref}$. The instantaneous changes in the bits representing the exponent E are fast-changing whereas the instantaneous changes in the bits representing the number K are slow-changing. Thus, the shift register control unit is actuated by the difference between the slow-changing bits representing K and the fast-changing bits representing E to drive a shift register which changes the mantissa A by 3 bits (gain of 8). In the alternative, the mantissa may be changed by 2 bits for a gain of 4 or shifted by 1 bit for a gain of 2. This "bit shifting" is equivalent to digital gain shifts and will remove all gain "jumps" due to exponent changes. From the aforementioned 3-bit-at-a-time shift register the bits representing the mantissa A, which have been appropriately shifted, are delivered to a 15-bit digital-to-analog converter (D-A converter). Of the bits delivered to the aforementioned D-A converter, 14 bits represent the mantissa A whereas 1 bit represents the sign, or polarity, of the signal. A voltage reference source, such as an exponential or sawtooth generator, is provided for the purpose of delivering a periodically varying reference voltage $V_{ref}$ to the fifteen-bit D-A converter. Also provided is a comparator unit which, in response to the periodically varying reference voltage $V_{ref}$, drives the three-bit binary counter which, in turn, generates the binary form number K.

The output signal delivered from the aforesaid D-A converter is an analog voltage $Vo$. The aforementioned analog voltage $Vo$ is delivered to both a demultiplexer unit and to an averaging circuit. The demultiplexer unit has a multiplicity of individual output channels; each output channel being coupled with a hold-and-filter circuit; the output from each filter circuit being delivered directly to a galvanometer-type oscillograph. The analog output voltage $Vo$ actuates the aforesaid averaging circuit which, in turn, controls the voltage source $V_{ref}$.

According to one aspect of the invention, there may be provided outputs from each of the hold-and-filter circuits to drive a summing network, the output of which also controls the averaging circuit.

Suffice it to say that in the aforesaid system the analog voltages developed by the D-A converter represent a compressed amplitude range analog signal corresponding to the input mantissa data and the gain data (represented by the exponent E). More particularly, the shifted mantissa data is processed to account for the natural energy decay of the seismic process.

DESCRIPTION OF THE PREFERRED EMBODIMENT

Figures 1, 4:
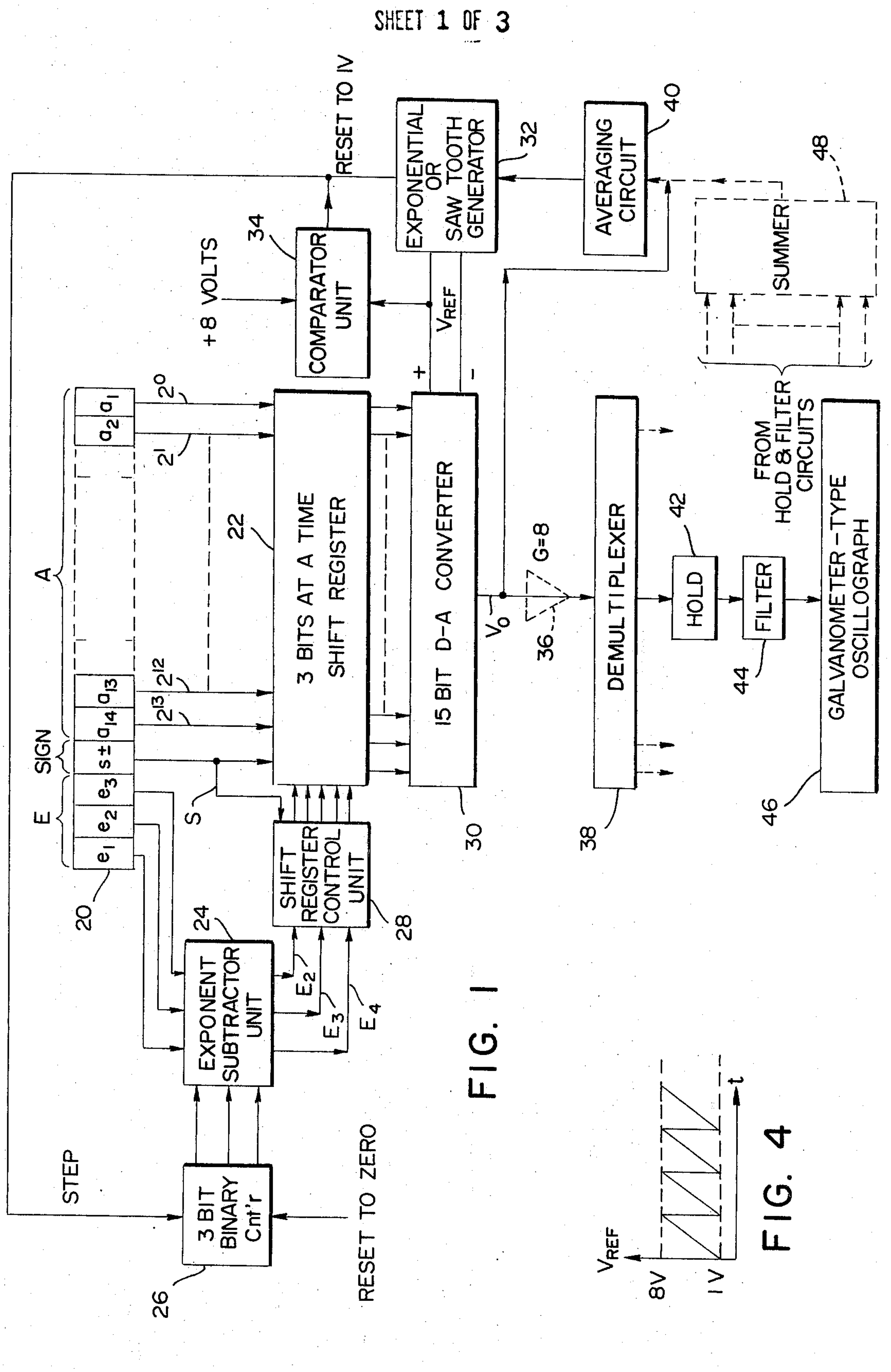
FIG. 1 shows a seismic playback/monitor system constructed in accordance with the present invention.
FIG. 4 is a graphical representation of a voltage occurring during the operation of the system shown in FIG. 1.

As shown in the FIG. 1, there is provided a register 20 which stores eighteen binary digits, or bits, which represent in digital form the amplitude of a seismic signal generated by a geophone. Of these eighteen bits, three bits, identified at bit location $e_1$, $e_2$ and $e_3$ in the register 20, represent the exponent E of a floating point digital word. Also, in the register 20 the fourteen bits identified at bit locations $a_1$ through $a_{14}$ represent the mantissa A. The additional bits S± represents the sign, or polarity, of the seismic signal. Thus, a positive-swinging or negative-swinging analog signal initially generated by a geophone is accurately represented as to its polarity by a corresponding digital form signal because of the inclusion of the sign bit.

The aforementioned eighteen bits may be assumed to have been initially recorded on a suitable storage means such as a storage means in the amplifier system disclosed in the U.S. Pat. application of James R. Vanderford, Ser. No. 786,706, filed Dec. 24, 1968. Operationally, these eighteen bits may be assumed to have been subsequently transferred to the register 20 for storage. The register 20 may be included in the amplifier system of Vanderford, hereinbefore identified, or for purposes of the present discussion may be considered to be an auxiliary register. Also, as indicated hereinbefore, since each amplifier stage in Vanderford's amplifier system has a constant gain of eight, then only the bits representing the exponent E and the mantissa A need to be recorded and delivered to the register 20.

The one bit representing the sign, or polarity, and the fourteen bits representing the mantissa A are subsequently transferred from the register 20 to a shift register 22, which is operative, in the manner hereinafter more fully described, to shift the bits representing the mantissa A by 3-bit locations at a time.

By shifting the binary digits, or bits, representative of the mantissa A by 3-bit positions at a time either up or down, the gain is changed by a factor of 8. Although the present specific embodiment of the invention is illustratively described in terms of shifting the mantissa bits by 3-bit positions, or locations, at a time for a gain change of 8, it is, nevertheless, to be understood that the bits representative of the mantissa may be changed or shifted by more or less than 3-bit locations at a time. For example, the mantissa bits may be changed by 2-bit positions at a time for a gain of 4 or by 1-bit position at a time for a gain of 2.

As illustrated in the accompanying FIG. 1, the three bits representative of the exponent E are transferred from the register 20 to an exponent subtractor unit 24. Exponent subtractor unit 24 may be a conventional type full subtractor circuit. The additional signals representative of 3 additional bits are delivered to input terminals of the exponent subtractor unit 24 from a 3 bit binary counter 26. The three bit binary counter 26 generates digital signals representative of three bits which are, in turn, representative of an integer K. The subtractor unit 24 provides digital signals $E_2$, $E_3$ and $E_4$, representative of an integer $(K - E)$, to a shift register control unit 28. The shift register control unit 28 provides control signals $E_5$ through $E_9$ to a 3-bit-at-a-time shift register 22 for the purpose of shifting the mantissa bits $a_1$ through $a_{14}$ stored therein by 3-bit positions at a time thereby changing the mantissa by gain factors of 8.

Figure 2:
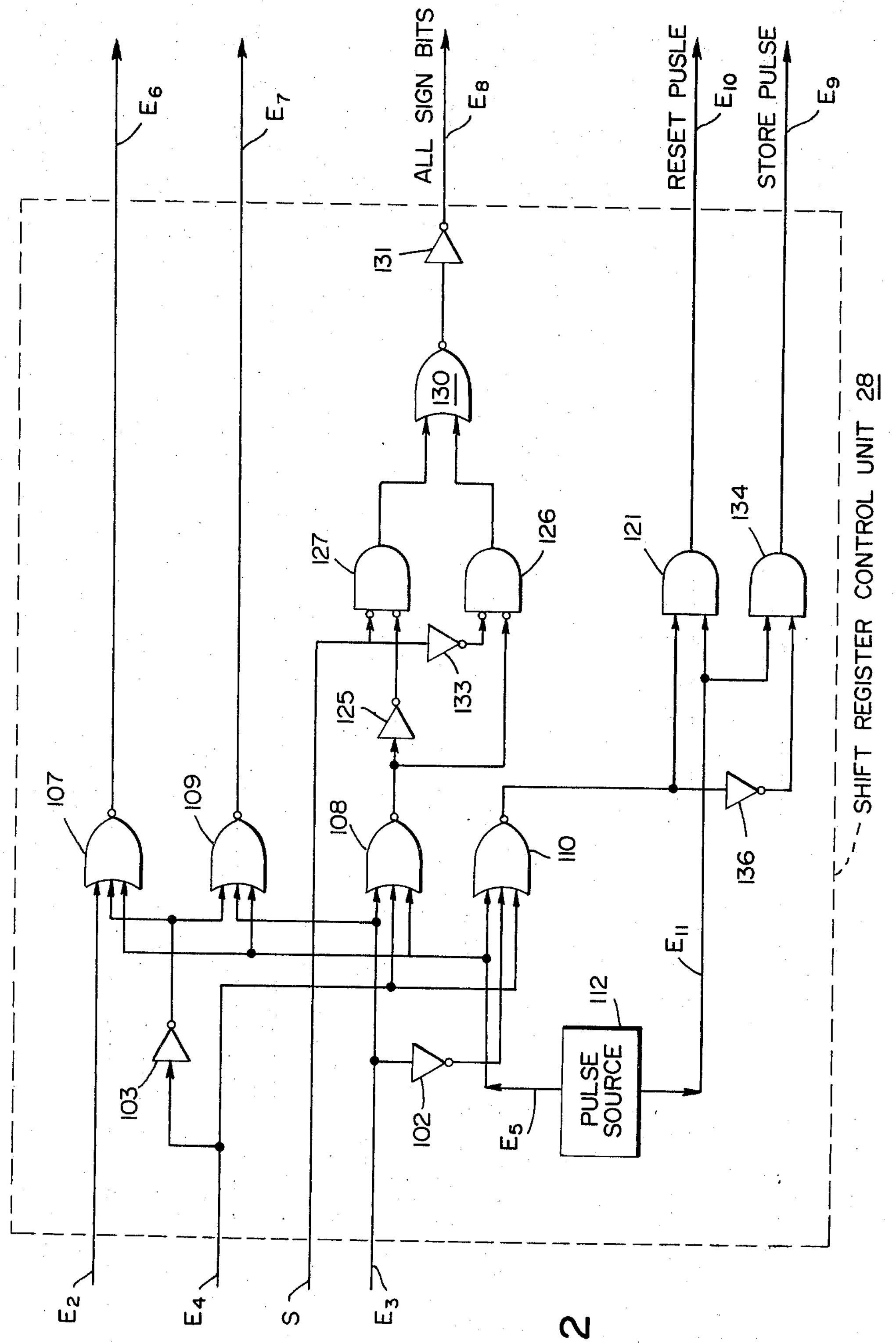
FIGS. 2 and 3 are detailed block diagrams of the shift register control unit and the shift register, respectively shown in FIG. 1.

Referring to FIG. 2, signals $E_2$, $E_3$ and $E_4$ are "Ones Complement" negative numbers. Signals $E_3$, $E_4$ are applied to inverters 102 and 103, respectively. Signal $E_2$ is applied to a NOR gate 107, signal $E_3$ is applied to NOR gates 108, 109 and signal $E_4$ is applied to NOR gates 108, 110. The output from inverter 102 is provided to NOR gate 110 while the output from inverter 103 is provided to NOR gates 107 and 109.

A pulse source 112 provides negative timing pulse $E_5$ to NOR gates 107 through 110 to interrogate the difference value from the exponent subtractor unit 28 when this information is available.

The output from NOR gate 107 is provided as a signal $E_6$. Signal $E_6$ is a positive pulse which occurs when $K - E$ is $-1$ or $-3$. Under that condition signal $E_2$, representing $2^0$, is at a low level and signal $E_4$, representing $2^2$, is at a high level, which is inverted to a low level by inverter 103, so that the occurrence of a pulse $E_5$ causes NOR gate 107 to provide a positive pulse.

The output from NOR gate 109 is provided as a signal $E_7$. Signal $E_7$ is a positive pulse which occurs when $K - E$ is $-2$ or $-3$. For that condition, signals $E_3$ and $E_4$ are at low and high levels, respectively. The high level signal $E_4$ is inverted to a low level by inverter 103 so that the occurrence of a pulse $E_5$ causes NOR gate 109 to provide a positive pulse.

Thus when $K - E$ is $-1$, only pulse $E_6$ occurs. When $K - E$ is $-2$, only pulse $E_7$ occurs. When $K - E$ is $-3$, pulses $E_6$ and $E_7$ occur simultaneously.

For the condition that $K - E$ is $-4, -5, -6$ or $-7$, signal $E_4$ is at a low level preventing NOR gates 107 and 109 from providing a pulse output thereby preventing the occurrence of pulses $E_6$, $E_7$. When $K - E$ is $-4$, signal $E_3$ is at a high level and signal $E_4$ is at a low level which inverted to a high level by inverter 103 NOR gate 110 provides a positive pulse when a pulse $E_5$ occurs in accordance with the high level signal $E_3$ and the high level output from inverter 103.

The positive pulse from NOR gate 110 is applied to an AND gate 121 and to an inverter 136. The positive pulse enables AND gate 121 so that the occurrence of a pulse $E_{11}$ from source 112 causes AND gate 121 to provide a "reset" pulse $E_{10}$. Pulses $E_{11}$ have the same pulse repetition rate as pulses $E_5$, however, each pulse $E_{11}$ will start at some predetermined time after the start of a corresponding pulse $E_5$ and will terminate before the corresponding pulse $E_5$ terminates.

When NOR gate 110 does not provide a positive pulse, its low level output disables AND gate 121 to prevent the occurrence of a "reset" pulse $E_{10}$. The low level output from NOR gate 110 is inverted to a high level by inverter 136 to enable an AND gate 134. Enabled AND gate 134 provides a "store" pulse $E_9$ in response to the occurrence of a pulse $E_{11}$. Obviously, when NOR gate 110 provides a positive pulse, AND gate 134 is disabled by the resulting negative going pulse from inverter 136. Thus, pulses $E_9$ and $E_{10}$ can not occur simultaneously.

For condition $K - E$ is either $-6$ or $-7$, signals $E_3$ and $E_4$ are at low levels and are applied to NOR gate 108. The occurrence of an $E_5$ pulse causes NOR gate 108 to provide a positive pulse to an inverter 125 and to a NAND gate 126. The positive pulse from NOR gate 108 inhibits NAND gate 126. Inverter 125 inverts the positive pulse to a negative pulse and provides it to another NAND gate 127. NAND gate 127 also receives the sign signal S from register 20. When signal S is at a high level for a "negative sign" NAND gate 127 is effectively inhibited. When signal S is at a low level for a "positive sign," a negative pulse from inverter 125 causes NAND gate 127 to provide a positive pulse to a NOR gate 130. NOR gate 130 provides a negative pulse output as signal $E_8$ is response to a positive pulse from either NAND gate 127 or 126.

When signal S is at a high level, an inverter 133 inverts it to a low level and applies it to NAND gate 126 so that NAND gate 126 provides a high level output when signal S is at a high level and there is an absence of a pulse from NOR gate 108. The high level output from NAND gate 126 causes NOR gate 130 to provide an output at a low level. The output from NOR gate 130 is inverted by an inverter 131 to provide signal $E_8$ putting all ones (A full scale positive number) into the shift register 22 as hereinafter, explained. When signal S is at a low level, all zeros are entered (a full scale negative number).

Figure 3:
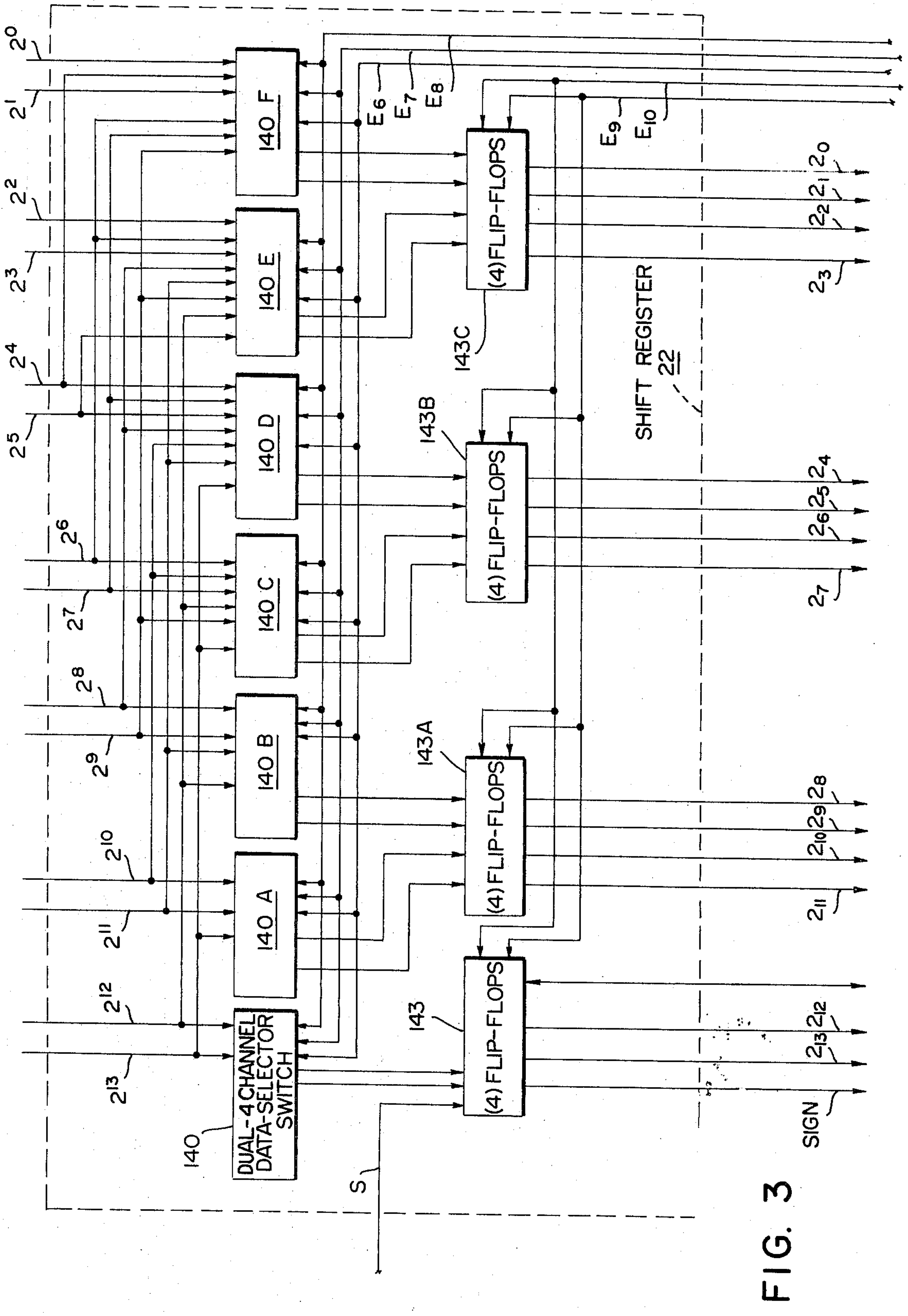

Referring to FIG. 3, signals $E_6$, $E_7$ and $E_8$ are applied to dual 4 channel data selector switches 140 through 140F. Data selector switches 140 through 140F may be of the type manufactured by Motorola as their part number MC 9801P. The output from switches 140 through 140F are applied to flip-flops 143 through 143C as hereinafter explained. The following Table shows the signals each switch receives in addition to signal $E_6$, $E_7$ and $E_8$ and their connections to flip-flops 143 through 143C. The occurence of a store pulse $E_9$ causes the outputs from the switches 140 through 140F to be entered into flip-flops 143 through 143C.

| SWITCH | SIGNALS | CONNECTED TO FLIP-FLOPS |
|---|---|---|
| 140 | $2^{12},2^{13}$ | 143 |
| 140A | $2^{10},2^{11},2^{13}$ | 143A |
| 140B | $2^{8},2^{9},2^{11},2^{12}$ | 143A |
| 140C | $2^{6},2^{7},2^{9},2^{10},2^{12},2^{13}$ | 143B |
| 140D | $2^{4},2^{5},2^{7},2^{8},2^{10},2^{11},2^{13}$ | 143B |
| 140E | $2^{2},2^{3},2^{5},2^{6},2^{8},2^{9},2^{11},2^{12}$ | 143C |
| 140F | $2^{0},2^{1},2^{4},2^{5},2^{6},2^{7},2^{12},2^{13}$ | 143C |

The switches are used to effectively shift the information bits as follows. For the purpose of illustration only we will examine signal $2^{13}$ which is applied to switches 140, 140A, 140C, 140D and 140F. When pulses $E_6$ and $E_7$ are at a low level, switch 140 will provide signal $2^{13}$ from register 20 to a flip-flop in flip-flops 143 which causes the flip-flop in flip-flop 143 to provide an output signal from shift register 22 whose position correspond to $2^{13}$. As can be seen there is no shifting done at this time.

Upon the occurrence of an $E_6$ pulse and an absence of an $E_7$ pulse, switch 140A passes the $2^{13}$ signal to a flip-flop in flip-flops 143A. That flip-flop provides an output signal whose position corresponds to $2^{10}$ in accordance with the $2^{13}$, input signal, so that in effect, signal $2^{13}$ has been shifted by three places.

When a pulse $E_7$ occurs while pulse $E_6$ is absent, switch 140C passes the signal $2^{13}$ to a flip-flop in flip-flops 143B. That flip-flop provides an output signal, whose position corresponds to $2^7$, in accordance with the $2^{13}$ signal so that for this condition, essentially signal $2^{13}$ has been effectively shifted six places.

For the conditions that pulses $E_6$ and $E_7$ occur simultaneously switches 140D and 140F provide signal $2^{13}$ to a flip-flop in flip-flops 143B and 143C which provides the output signals whose positions correspond to $2^4$ signals, so that for this condition, essentially the signal $2^{13}$ has been effectively shifted nine places.

The following Table shows the shifting of the digital signals $2^0$ to $2^{13}$ and the sign signal as a result of the absence or occurrence of pulses $E_6$ and $E_7$.

| SIGNALS | | SHIFT REGISTER 22 OUTPUTS | | | | | | | | | | | | | |
|---|---|---|---|---|---|---|---|---|---|---|---|---|---|---|---|
| $E_6$ | $E_7$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
| 0 | 0 | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
| 1 | 0 | S | S | S | $2^{13}$ | $2^{12}$ | $2^{11}$ | $2^{10}$ | $2^9$ | $2^8$ | $2^7$ | $2^6$ | $2^5$ | $2^4$ | $2^3$ |
| 0 | 1 | S | S | S | S | S | S | $2^{13}$ | $2^{12}$ | $2^{11}$ | $2^{10}$ | $2^9$ | $2^8$ | $2^7$ | $2^6$ |
| 1 | 1 | S | S | S | S | S | S | S | S | S | $2^{13}$ | $2^{12}$ | $2^{11}$ | $2^{10}$ | $2^9$ |

The all signs signal $E_8$ is applied to switches 140 through 140F so that those switches that pass the all signs signal $E_8$ when K − E is −6 or −7 under that condition, signal $E_8$ is at an opposite level than signals thus putting the complement of the sign bit into all bit positions of the shift registger 22. This will be a full scale positive or full scale negative number depending upon the sign bit. Also, signal $E_8$ is provided to the left to fill in for shifting as shown in the last known table when K − E is not −6 or −7.

As noted previously, when K − E is either −4 or −5, a store pulse $E_9$ or a reset pulse $E_{10}$ may be generated. Signal $E_{10}$ is generated for the −4 or −5 condition to reset the shift register 22 (flip-flops 143 to 143C) to contain all zeros or the numerical value zero. At all time other than the condition −4 or −5, the $E_9$ pulse will occur to move information from the outputs of switches 140–140F under the conditions of $E_6$, $E_1$ and $E_8$ into the flip-flops 143–143C of shift register 22.

Referring again to FIG. 1, digital signals representative of the shifted binary digits, or bits, contained in shift register 22 are subsequently delivered to a 15-bit digital to analog (D-A) converter 30. Also provided is a periodically varying voltage source 32 which provides an output voltage $V_{ref}$. The output voltage $V_{ref}$ varies with time as illustrated in the small-size graphical presentation shown in FIG. 4 next to the voltage source 32. An exponential or saw-tooth generator may be used as the voltage source 32. As indicated, the voltage $V_{ref}$ is delivered to an input of the D-A converter 30 as well as to an input of a comparator unit 34. In the specific example shown in the drawing $V_{ref}$, during one cycle of operation, increases linearly from a minimum of 1 volt to a maximum of 8 volts, at which level it abruptly returns to the minimum 1-volt level, ready to begin another cycle. $V_{ref}$ would vary from 2 volts to 8 volts for a gain of 4 system and from 4 volts to 8 volts for a gain of 2 system.

The comparator unit 34 receives two input signals: $V_{ref}$ and a positive source of 8 volts (identified in the drawing as +8 volts). Also, as shown the comparator unit 34 generates an output signal which is coupled to both the sawtooth generator 32 and to the 3-bit binary counter 26. The output signal delivered by the comparator unit 34 serves two purposes: first, this signal resets the saw-tooth generator 32 so that generator 32 starts a new operating cycle at the 1-volt level after having reached its maximum level of an 8-volt output; second, the signal from comparator unit 34 acts to step the 3-bit binary counter 26 so that the digital output signal K therefrom is changed by one octal digit. (The change, of course, is made in the binary digit or digits representing the octal digit.)

The 15-bit digital-to-analog converter 30 which receives the aforementioned inputs from the shift register 22 and from the saw-tooth generator 32 produces an output signal voltage $V_o$ which is an analog voltage signal. The voltage $V_o$ is a function of: $e_{in}$, an analog input voltage initially developed by one of the geophones; A, the mantissa; E, the exponent; G, the base, or radix, of the number system employed and also the gain, which in the present illustrative system is the octal number 8; K, the output integer developed by the three-bit binary counter 26; and, $V_{ref}$, an analog voltage developed by the voltage source 32. The analog output voltage $V_o$ from the converter 30 may, if desired, be delivered to an input terminal of an amplifier 36 having a gain G equal to 8. The amplifier 36 is shown in the drawing in dotted lines since it may not be required if the level of the analog voltage $V_o$ is sufficiently high. If the amplifier 36 is not needed, the analog output voltage $V_o$ delivered by the converter 30 may be delivered directly to an input terminal of a demultiplexer 38. As is indicated in the drawing, the demultiplexer 38 is provided with a plurality of output channels. However, for purposes of clarity only one output channel is illustrated. Thus, as shown, a particular analog signal $V_o$ is delivered to an output terminal of the demultiplexer 38 and said signal is directly coupled to an input of a hold circuit unit 42. From the hold circuit unit 42 the signal $V_o$ is delivered to a filter circuit unit 44 from whence it is ultimately delivered to a galvanometer-type oscillograph 46 whereat an oscillogram, or wiggle trace, is made thereby providing a visible record of a seismic disturbance of interest.

Each output channel of the demultiplexer 38 is provided with a separate hold circuit 42 and a separate filter circuit 44. For purposes of clarity only one hold circuit 42 and only one filter circuit 44 have been illustrated in the drawing. It is, however, to be understood that each of the output channels from demultiplexer 38 is provided with separate hold and filter circuits 42 and 44, respectively.

As illustrated, the analog output signal $V_o$ from the D-A converter 30 is also fed into an input terminal of an averaging circuit 40. The averaging circuit 40 delivers an output analog signal to another input terminal of the voltage source 32. Also, as suggested in dotted lines in the drawing, each of the outputs from the filter circuit 44 in a corresponding channel of each of the output channels of the demultiplexer 38 may be directly coupled to a separate input of a summing circuit 48. The output from the summing circuit 48 is directly coupled to the input of the averaging circuit 40.

Operationally the playback or monitoring system shown in the drawing operates in the manner described in the following paragraphs:

Signals representing the exponent E (i.e., the bits designated $e_1$, $e_2$, and $e_3$) are routed from register 20 to the exponent subtractor unit 24. Also, signals representing the mantissa A and sign bits (i.e., the bits $a_1$ through $a_{14}$ and S±) are delivered from register 20 to the shift register 22. The reference voltage generator 32 delivers the signal $V_{ref}$ to the 15-bit D-A converter 30. In accordance with one specific illustrative, but not limiting, embodiment of the invention $V_{ref}$ is varying with respect to time between +1 volt and +8 volts, as indicated in the graph in the drawing. Moreover, as shown, $V_{ref}$ is a periodic function. See the sawtooth wave form shown in FIG. 4.

The comparator unit 34 senses the voltage level of $V_{ref}$ and compares it with its +8 volt reference input. Each time $V_{ref}$ reaches +8 volts the comparator unit 34 delivers an output signal which causes two things to happen: resets $V_{ref}$ to +1 volt and causes the 3-bit binary counter 26 to advance; i.e., to increase K by +1.

Operationally the three-bit counter 26 is initially set to zero to start and it keeps track of the exponent value of the envelope of energy change and the gain (average) increase required to maintain a constant output (inverse gain or AGC). The 3-bit binary counter 26 is stepped, or advanced, by the comparator unit 34 in response to the output of saw-tooth or exponential generator 32. For example, each time $V_{ref}$ varies over a range of 8 to 1 counter 26 is advanced.

Inasmuch as the average exponent stored in the register 20 is decaying following the average energy decay, the difference between the integer K generated by the 3-bit binary counter 26 and the exponent E in register 20 will, on the average, be constant thereby holding the average output constant. The instantaneous changes in the exponent E in the register 20 (i.e., the signals represented by the bits $e_1$, $e_2$ and $e_3$) as the signals decrease from peak values related to the average envelope of energy to zero crossings will be taken care of by the difference between the slowly changing integers generated by counter 26 and the rapidly changing exponent E in the register 20. The difference normally will always be a positive integer as a design choice and the value of this integer (K - E) generated by the subtractor unit 24 actuates the shift register control unit 28. The control unit 28, in turn, causes a shifting of the bits in shift register 22. Thus, the integer (K - E), which represents the slowly changing signal K generated by the counter 26 and the rapidly changing exponent E in the register 20, is used for the purpose of digitally shifting the bits comprising the mantissa A in the shift register 22; i.e., a shift of 3 bits at a time representing a gain of 8, as indicated in the drawing. However, it is to be understood that 2 bits at a time may be shifted in register 22 to provide a gain of 4 or, in the alternative, 1 bit may be changed to provide a gain of 2. In any event, the aforementioned bit shifting is equivalent to digital gain shifts and is effective to remove all gain "jumps" or distortions due to exponent changes.

Ultimately, after being shifted, the bits from shift register 22 are delivered to the 15-bit D-A converter 30 to provide the analog output signal $V_o$.

As shown in the drawing, the analog output signal $V_o$ which emanates from the D-A converter 30 may be routed directly to the demultiplexer 38 and also directly to the input of an averaging circuit 40. The averaging circuit 40 functions to control the rate of the periodic saw-tooth or exponential voltage $V_{ref}$. After the analog signal $V_o$ has been passed through demultiplexer 38, it passes through hold and filter circuits 42 and 44, respectively, before being delivered to an oscillograph 46, as shown. However, in the alternative, the output of each of the filter circuits 44 may be connected to a summing circuit 48. As illustrated, the output of summing circuit 48 is delivered to the input of the averaging circuit 40.

In the playback of monitoring system illustrated in the drawing the original geophone signal $e_{in}$ is recreated without exponent "jumps" or distortions. The system illustrated and herein described applies inverse gain to maintain the output constant and to smooth out binary gain changes. The outut signals $V_o$ may be routed through the summing circuit 48 as indicated in the drawing (after having been passed through the hold and filter circuit) and employed to control (in conjunction with averaging circuit 40) the rate of change of the saw-tooth or exponential voltage $V_{ref}$ in an AGC mode to follow the average energy change of any given playback regardless of the envelope decay rate.

Although specific way and means of practicing the invention have been described heretofore and illustrated in the accompanying drawing, it is, nevertheless, to be understood that this has been done for the purpose of illustration only and that the scope of the invention is not to be limited thereby, but is to be determined from the claims annexed herewith and forming part of the specification.

What is claimed is:

1. A method for providing analog signals $V_o$, suitable for making a visible display, in accordance with the following equation:

$$e_{in} = \pm AG^{-E}$$

wherein $e_{in}$ represents the amplitude of a particular analog signal among a wide dynamic range of analog signals, *A* represents a matissa, *G* represents a radix of the number system used, and *E* represents an exponent and wherein *G* is a constant, which comprises; providing digital signals forming a digital word for each analog signal in said range of analog signals, some of said signals in a digital word represent *A* and some represent *E;* generating a periodic analog reference signal $V_{ref}$ which has maximum and minimum signal levels; generating a digital signal corresponding to a number K, changing said K digital signal so as to change the value of the number K each time $V_{ref}$ reaches its maximum level; combining the digital signals corresponding to K and E to produce another digital signal corresponding to (K - E); shifting the position of the digital signals corresponding to the term A in accordance with the K - E digital signal to produce another digital signal representing a modified A; combining the analog signal $V_{ref}$ and the signal representing a modified A to produce an analog signal $V_o$ for each digital word; averaging each of the analog signals $V_o$ developed from each digital word; and producing said analog signal $V_{ref}$ as a function of the analog signals $V_o$ so averaged.

2. A method as described in claim 1 further comprising the steps of holding and filtering each analog signal $V_o$ to produce a final analog signal; and visibly displaying the final analog signals.

3. A system for providing analog signals $V_o$, suitable for making a visible display, in accordance with the following equation:

$$e_{in} = \pm AG^{-E}$$

wherein $e_{in}$ represents the amplitude of a particular analog signal among a wide dynamic range of analog signals, *A* represents a matissa, *G* represents a radix of the number system used and *E* represents an exponent and wherein *G* is a constant, comprising means for providing digital signals forming a digital word for each analog signal in said range of analog signals, some of said digital signals in each digital word represent *A* and some represent *E;* means for generating a periodic analog reference signal $V_{ref}$ which has maximum and minimum signal levels; means for generating a digital signal representing a number K and changing said digital signal and hence the number *E* each time $V_{ref}$ reaches its maximum level; means for combining the digital signal representing K and E to produce another digital signal representing (K - E); means for shifting the position of digital signals representing *A* in response to the digital signal representing (K - E) to produce another digital signal representing a modified *A;* means for combining the analog signal $V_{ref}$ and the signal representing a modified A to produce an analog signal $V_o$ for each digital word; means for averaging each of the analog signals $V_o$ developed from each digital word; and means for producing said signal $V_{ref}$ as a function of the analog signals $V_o$ so averaged.

4. A system as described in claim 3 comprising means for holding and filtering each analog signal $V_o$ to produce a final analog signal; and means for visibly displaying the final analog signals thus produced.

5. A system as described in claim 4 in which the means for providing signal $V_{ref}$ includes means for providing a saw-tooth signal.

6. A system as described in claim 5 in which the shifting means includes means connected to the first combining means for converting the digital signal representing K - E from the first combining means to provide control pulses, switching means connected to the coverting means and receiving the digital signals corresponding to the term A for shifting the received digital signals in accordance with the control pulses; and means connected to the switching means and to the second combining means for storing and providing the shifted digital signals to the second combining means.

7. A system as described in claim 6 further comprising means connected to the first combining means, to the switching means and to the storing means for controlling the switching means and the storing means so that the storing means provides digital signals to the second combining means having the same amplitude when the digital signal representing K - E corresponds to predetermined values for K - E.

8. A method for providing final analog signals suitable for making a visible display, in accordance with the following equation:

$$e_{in} = \pm AG^{-E}$$

wherein $e_{in}$ represents the amplitude of a particular analog signal among a wide dynamic range of analog signals, $A$ represents a matissa, $G$ represents a radix of the number system used, and $E$ represents an exponent and wherein $G$ is a constant, which comprises providing digital signals forming a digital word for each analog signal in said range of analog signals, some of said signals in a digital word represent A and some represent $E$; generating a periodic analog reference signal $V_{ref}$ which has maximum and minimum signal levels; generating a digital signal corresponding to a number K, changing said K digital signal so as to change the value of the number K each time $V_{ref}$ reaches its maximum level; combining the digital signals corresponding to K and $E$ to produce another digital signal corresponding to (K - $E$); shifting the position of the digital signals corresponding to the term $A$ in accordance with the K - $E$ digital signal to produce another digital signal representing a modified $A$; combining the analog signal representing $V_{ref}$ and the signal representing a modified A to produce an analog signal $V_o$ for each digital word; holding and filtering the analog signals $V_o$ to produce corresponding final analog signals; summing the final analog signals to produce a sum signal; averaging the sum signal to provide an average signal; and providing said $V_{ref}$ signal as a function of the average signal.

9. A method as described in claim 8 further comprising the step of visibly displaying the final analog signals.

10. A system for providing final analog signals suitable for making a visible display, in accordance with the following equation:

$$e_{in} = \pm AG^{-E}$$

wherein $e_{in}$ represents the amplitude of a particular analog signal among a wide dynamic range of analog signals, $A$ represents a matissa, $G$ represents a radix of the number system used and $E$ represents an exponent and wherein $G$ is a constant, comprising means for providing digital signals forming a digital word for each analog signal in said range of analog signals, some of said digital signals in each digital word represent $A$ and some represent $E$; means for generating a periodic analog reference signal $V_{ref}$ which has maximum and minimum signal levels; means for generating a digital signal representing a number $K$ and changing said digital signal and hence the number $E$ each time $V_{ref}$ reaches its maximum level; means for combining the digital signals representing K and $E$ to produce another digital signal representing (K - $E$); means for shifting the position of digital signals representing A in response to the digital signal representing (K - $E$) to produce another digital signal representing a modified $A$; means for combining the analog signal $V_{ref}$ and the signal representing a modified $A$ to produce an analog signal $V_o$ for each digital word; means for holding and filtering the analog signals $V_o$ to produce corresponding final analog signals; means for summing the final analog signals and to providing a corresponding sum signal, means connected to the summing means and to the $V_{ref}$ signal generating means for averaging the sum signal and providing a corresponding average signal to the $V_{ref}$ generating means so that the $V_{ref}$ signal is generated as a function of the average signal.

11. A system as described in claim 10 further comprising means for visibly displaying the final analog signals thus produced.

12. A system as described in claim 11 in which the means for providing signal $V_{ref}$ includes means for providing a saw-tooth signal.

13. A system as described in claim 12 in which the shifting means includes means connected to the first combining means for converting the K - E digital signal from the first combining means to provide control pulses, switching means connected to the converting means and receiving the digital signals corresponding to the term A for shifting the received digital signals in accordance with the control pulses; and means connected to the switching means and to the second combining means for storing and providing the shifted digital signals to the second combining means.

14. A system as described in claim 13 further comprising means connected to the first combining means to the switching means and to the storing means for controlling the switching means and the storing means so that the storing means provides digital signals to the second combining means having the same amplitude when the (K - E) digital signal corresponds to predetermined values for K - E.

* * * * *

UNITED STATES PATENT AND TRADEMARK OFFICE

CERTIFICATE OF CORRECTION

PATENT NO. : 3,872,465

DATED : March 18, 1975

INVENTOR(S) : Robert J. Loofbourrow

It is certified that error appears in the above-identified patent and that said Letters Patent are hereby corrected as shown below:

Page I, line 13, "recoreded" should read --recorded--

Column 2, line 64: "$AG^{116E}$ should read --$AG^{-E}$--

Column 3, line 9; "$AB^{116E}$" should read --$AB^{-E}$--

Column 9, line 6: "registger" should read --register--

Column 11, line 58: "circuit" should read --circuits--

Signed and Sealed this

*eighteenth* Day of *November 1975*

[SEAL]

*Attest:*

RUTH C. MASON
*Attesting Officer*

C. MARSHALL DANN
*Commissioner of Patents and Trademarks*